United States Patent [19]
White

[11] Patent Number: 5,907,538
[45] Date of Patent: May 25, 1999

[54] FULL DUPLEX COMMUNICATION CIRCUIT WITH A TRANSDUCER FOR SIMULTANEOUSLY GENERATING AUDIO OUTPUT AND RECEIVING AUDIO INPUT

[76] Inventor: Donald R. White, 12560 SW. Caballero Ct., Beaverton, Oreg. 97008

[21] Appl. No.: 08/801,525

[22] Filed: Feb. 18, 1997

[51] Int. Cl.⁶ .................................................. H04B 1/56
[52] U.S. Cl. ......................... 370/276; 379/394; 379/403
[58] Field of Search ................................. 370/276, 278,
370/282, 296, 284, 283, 285; 379/403,
388, 389, 390, 394, 402, 409, 410, 420;
381/55, 59, 71.1, 96, 106

[56] References Cited

U.S. PATENT DOCUMENTS

| | | | |
|---|---|---|---|
| 3,114,105 | 12/1963 | Neumiller | 325/16 |
| 3,370,236 | 2/1968 | Walker | 325/16 |
| 4,002,860 | 1/1977 | Terai et al. | 179/170 R |
| 4,052,562 | 10/1977 | Andersen | 370/282 |
| 4,598,396 | 7/1986 | Upp et al. | 370/284 |
| 4,629,829 | 12/1986 | Puhl et al. | 379/58 |
| 4,691,313 | 9/1987 | Iwata | 370/278 |
| 4,741,018 | 4/1988 | Potratz et al. | 370/278 |
| 4,912,758 | 3/1990 | Arbel | 379/388 |
| 5,007,046 | 4/1991 | Erving et al. | 370/32.1 |
| 5,115,471 | 5/1992 | Liden | 381/106 |
| 5,168,522 | 12/1992 | Simanis et al. | 380/38 |
| 5,235,637 | 8/1993 | Kraz et al. | 379/389 |
| 5,265,264 | 11/1993 | Dzunt et al. | 455/90 |
| 5,311,144 | 5/1994 | Graset | 330/252 |
| 5,379,450 | 1/1995 | Hirasawa et al. | 455/54.2 |
| 5,471,666 | 11/1995 | Sugiyama et al. | 455/348 |
| 5,586,193 | 12/1996 | Ichise et al. | 381/106 |
| 5,715,309 | 2/1998 | Bartkowiak | 379/390 |

OTHER PUBLICATIONS

Bilateral Speaker Networks Form Switchless Intercom, Frank Kasparec, St. Poelten, Austria, Electronics, vol. 53, p. 131, Jul. 3, 1980.
Compandor IC (Noise Reduction System), TK10651M, –L,–D, TokyoSemiconductor, Catalog No. Z–1480110E.
D5004 Cellular Telephone Echo Control Device, DSP Group, Inc. Jan. 1991, Rev. 2.0.
Telephone Coupling Transformer, Mouser Electronics, Feb. 16, 1995.
Audio Transformers Telephone Coupling, Magna Tek, 90 East Union Street, Goodland, IN 47948.
Engineering Bulletin, Magnetek Goodland, pp. 2–3.
Low Voltage Compander, Specification and Applications Information, Motorola Semiconductors, MC33110.
LA8632M, Case Outline: MFP–24S(300mil) Plastic Package.

*Primary Examiner*—Dang Ton
*Assistant Examiner*—Phirin Sam
*Attorney, Agent, or Firm*—Klarquist Sparkman; Campbell Leigh & Whinston LLP

[57] ABSTRACT

A full duplex communication circuit uses a transducer as both a microphone and speaker/earphone to provide full duplex communication without acoustical feedback. The circuit uses a novel amplifier configuration to apply a signal received from a remote source to the transducer without loading it. The output of the transducer has a combined transmit and receive signal. To eliminate feedback of the receive signal in the output of the transmit signal, an audio processing circuit (analog) takes this combined signal and simultaneously compresses the receive signal and expands the transmit signal to produce a transmit signal that is 35–40 dB greater than the receive signal at the output.

26 Claims, 7 Drawing Sheets

FULL DUPLEX COMMUNICATION CIRCUIT WITH A TRANSDUCER FOR SIMULTANEOUSLY GENERATING AUDIO OUTPUT AND RECEIVING AUDIO INPUT

FIELD OF THE INVENTION

The invention relates to audio communication circuitry and more specifically relates to full duplex communication using a transducer that simultaneously acts as both a microphone and speaker.

BACKGROUND OF THE INVENTION

The term "full duplex" in the context of a communication device means that the device simultaneously transmits and receives signals. To the user, this means that he or she can simultaneously talk and listen to another party through the device. Conversely, the term "half duplex" in this context means that the device can only transmit or receive at one time, but not both. Full duplex is obviously better than half duplex communication because it enables parties to communicate from remote locations as if they were standing face to face. However, full duplex communication is more difficult to implement in speaker phones because of the problem of acoustical and electrical feedback. Acoustical feedback occurs when sound from the speaker travels back to the microphone. Electrical feedback is similar, yet pertains to the electrical signals representing the audio input (the signal transmitted to the remote device) and the audio output (the signal received from the remote source). Electrical feedback occurs when the transmit and receive circuits are not completely isolated from each other and form a closed loop with a loop gain greater than one. To eliminate feedback entirely, the overall loop gain, including both acoustical and electrical effects, must be less than one.

The majority of speaker phones for hands-free and group communication are half duplex configurations that utilize fast switching circuitry to alternate between: 1) broadcasting audio output through a speaker, and 2) listening for audio input in a separate microphone. If this switching did not take place, the speaker would produce an annoying squeal due to the acoustical feedback path from the speaker to the microphone. The switching circuitry prevents the speaker and microphone from being active at the same time, and therefore, audio output from the speaker will not induce electrical signals in the microphone. While the switching avoids the squeal, it can be annoying in itself because the user cannot speak and listen at the same time. The switching circuitry compares the strength of the broadcast signals from each direction and allows only the stronger of the two to be transmitted to the opposite end.

Since full duplex communication requires a complete closed loop for simultaneously sending and receiving signals between the two locations of conversation, the overall loop gain must be less than one. One way to ensure that the loop gain is less than one is to use digital signal processing to detect feedback and attempt to cancel it. Speaker phones that employ this approach are sometimes referred to as digital full duplex speaker phones. These devices include a separate speaker and microphone, and an analog to digital conversion circuit to recognize, with adaptive filters, the signal gain variances between the transmit and receive signal paths caused by audio output of the receive signal entering the transmit portion of the loop via the microphone. In response to detecting this feedback, these devices use electronically controlled attenuators in each side of the loop to ensure that the loop gain is less than one.

While the attenuators can reduce the annoying squeal of feedback, they can tend to undermine performance of the device by reducing the gain on the audio output to such an extent that is difficult for the user to hear. At times, the attenuator needs to reduce the gain on the receive signal so much that the user cannot here the other party's voice. In addition to this drawback, the digital configurations are several times more costly then the half duplex speaker phone configurations.

One proposed solution to the acoustical feedback problem is shown in U.S. Pat. No. 4,002,860, which describes a communication device that uses a single transducer as both a speaker and microphone to eliminate acoustical feedback. The circuit design shown in this patent does not effectively eliminate electrical feedback however. This circuit uses devices called hybrid transformers in an attempt to isolate the transmit and receive signals from each other. The telephone circuits used to provide isolation in this circuit are actually only capable of providing about 15 dB of isolation. The amount of isolation is also highly dependent on the degree to which the circuit can match the impedance of the transducer and of the telephone line. Because of the circuit's inability to isolate the transmit and receive signals, it will generate a significant amount of feedback for this reason alone.

Another drawback of the circuit shown in the '860 patent is that the circuit applies a load across the transducer. Loading of the transducer can significantly undermine the effectiveness of this circuit because it interferes with the transmit signal induced in the transducer from an acoustical voice input. In a typical microphone, the signals induced from the user's voice are quite small on the order of 10 mV. Any loading of the transducer draws away the energy of the induced signal. To deal with these losses, the circuitry for processing the transmit signal can amplify the small voice signals, but if there is any feedback of the receive signal to the amplifier in the transmit circuitry, the feedback problem highlighted above becomes even worse.

SUMMARY OF THE INVENTION

The invention provides a full duplex audio communication circuit and related method that more effectively addresses the feedback problem and achieves improved performance relative to existing full duplex communication devices. The audio communication circuit uses a transducer as a speaker to convert the signal received from an external source into audio output and as a microphone to generate an electrical transmit signal. Operating as both a speaker and microphone, the transducer's output comprises a combined transmit and receive signal. In order to generate the transmit signal with minimal feedback, the communication circuit takes this combined signal and decreases the receive signal relative to the transmit signal. One implementation of the circuit, for example, is able to produce a final transmit signal where the transmit signal is 30 dB greater than the receive signal.

The communication circuit can employ one or more types of circuits for simultaneously compressing the receive signal and expanding the receive signal. One type of circuit is an expander-compressor that simultaneously decreases the receive signal and increases the transmit signal in the combined transmit-receive signal. Preferably, the expander compressor is implemented with log amps that logarithmically expand the receive signal and reduce the transmit signal.

Another type of circuit, which also simultaneously compresses the receive signal and expands the transmits signal, uses a differential amplifier to cancel the common mode signals applied to its input terminals. Specifically, the differential amplifier cancels two in phase receive signals from an external source (the audio input) and produces an output signal having a transmit signal component and a substantially canceled receive signal component. One way to use the differential amplifier is to couple matching transducers, with opposite polarity, to each input of the differential amplifier. In this type of configuration, the receive signal at the inputs of the differential amplifier are in phase while the transmit signals are out of phase. Since the differential amplifier subtracts the signals at its inputs, the transmit signal output is approximately doubled while the receive signal is substantially canceled. Both of these types of circuits can be used alone or in combination in various configurations to decrease the receive signal relative to the transmit signal. Ultimately, the communication circuit can generate a final transmit signal in which the transmit portion is substantially increased and the receive signal portion is negligible.

The ability to take a combined transmit-receive signal and substantially cancel the receive signal enables implementations of the communication circuit to effectively reduce feedback. For example, in one implementation, the transducer produces a transmit signal around 3 mV and simultaneously converts a receive signal in the range of 300 mV to audio output. This implementation combines compressor-expanders and in a differential configuration to take the combined transmit-receive signal and produce a transmit signal at about 300 mV and a receive signal at a level that is 30 dB or lower relative to the transmit signal.

Another significant advantage of the communication circuit is that it can be implemented without loading or shunting the transducer. In one implementation, an amplifier is coupled to the transducer to apply the receive signal from a remote source to the transducer without loading it. The amplifier also avoids shunting the receive signal. There are a variety of alternative configurations of the amplifier that avoid loading the transducer. In one configuration, for example, the amplifier is implemented with an op amp and the receive signal is applied to the non-inverting input, while the transducer is coupled to the inverting input. Because of the characteristics of the op amp in this configuration, the amplifier applies the energy of the receive signal to the transducer without loading the transducer or causing losses in the receive signal.

Further advantages and features of the invention will become apparent from the following detailed description and accompanying drawings.

DETAILED DESCRIPTION

Figure 1:
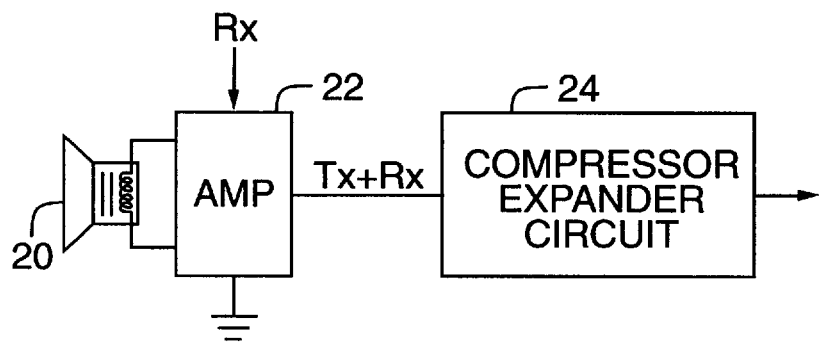
FIG. 1 is a general block diagram illustrating an implementation of a full duplex audio communication circuit.

FIG. 1 is a general block diagram illustrating an implementation of a full duplex audio communication circuit. The circuit includes a single transducer 20, an amplifier 22 coupled to the transducer, and a compressor-expander circuit 24 coupled to the output of the amplifier. The amplifier 22 receives an electrical input signal representing audio input (the receive signal Rx) and transfers it to the transducer 20, which then converts the receive signal into audio output. The transducer 20 also converts audio input, such as a user's voice, to an electrical transmit signal (the transmit signal Tx). Thus, the transducer 20 acts as both a microphone for converting audio input to an electrical transmit signal and a speaker for converting the electrical signal received from an external source into audio output. Note that there is no acoustical feedback path because the speaker and microphone are implemented within a single transducer. This avoids the need for electronically controlled attenuators to reduce the effects of acoustical feedback.

Since the transducer simultaneously receives the Rx signal and generates the Tx signal, there is a combined transmit and receive signal (Tx+Rx) at the output of the transducer 20. The amplifier 22 communicates this combined signal to the compressor-expander circuit 24. The compressor-expander circuit 24 takes the combined signal and simultaneously compresses the Rx signal and expands (increases) the Tx signal. Preferably, the compressor-expander circuit 24 is a logarithmic compressor-expander, which logarithmically expands the Tx signal and compresses the Rx signal. The Tx signal induced in the transducer 20 is typically quite small (e.g., about 3 mV) relative to the Rx signal applied to the transducer (which is about 300 mV). The compressor-expander is designed to compress signals in one voltage range and expand signals in another voltage range. Here, the objective is to send the Tx signal and substantially cancel the Rx signal to prevent feedback. To accomplish this, the compressor-expander is designed to compress signals above a threshold voltage level and expand signals below a threshold level. By compressing and expanding different parts of the signal simultaneously, the compressor-expander circuit 24 can make the Tx signal substantially larger and the Rx signal substantially smaller, and thus, reduce the difference between the transmit and receive signals.

The communication circuit shown here is "full duplex" because it simultaneously transmits and receives audio communication signals. When implemented in a phone handset or intercom, for example, the parties on each end of the line can simultaneously speak and hear each other's voices.

One significant advantage of this implementation is that the amplifier 20 avoids loading the transducer 20. The amplifier 22 is designed to drive the transducer 20 with minimal loss of the receive and transmit signals. To obtain the best performance, the receive signal should be applied to the transducer with minimal loading. Any loading of the transducer will lead to the loss of a portion of the transmit signal, which can seriously degrade performance especially because the transmit signal is typically quite small relative to the receive signal. In addition, the transmit signal should be generated without creating a loss of the receive signal in the transducer. One way to avoid having the transmit signal interfere with the receive signal is to place an impedance (a shunt) between the transducer and the source of the receive signal. This shunting of the transducer is undesirable because it causes loss of a portion of the receive signal. In this implementation, the amplifier 22 is connected to the transducer 20 to prevent both loading and shunting the transducer. This amplifier 22, therefore, is able to transfer the Tx signal with negligible loss, and is also able to apply the Rx signal to the transducer 20 with negligible loss.

Figure 2:
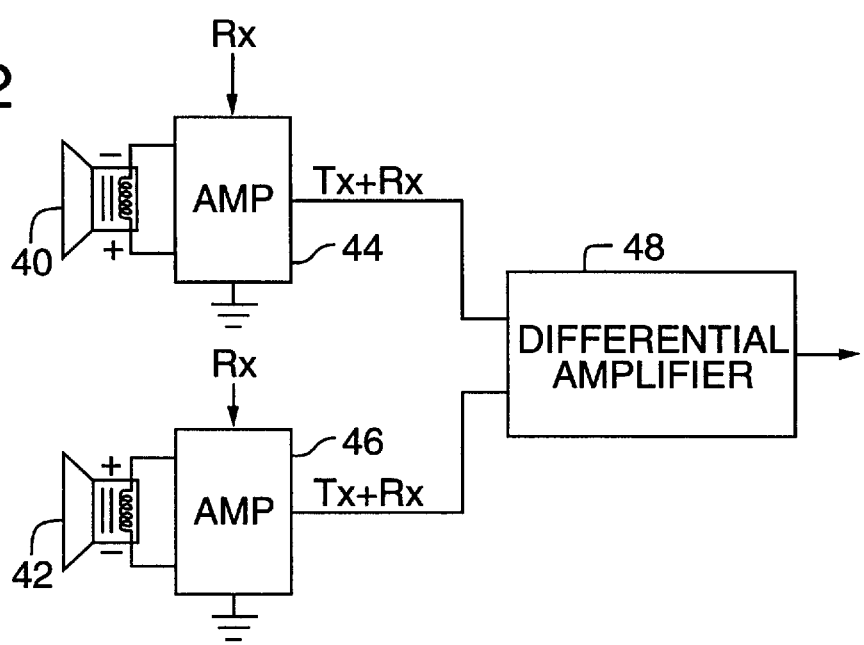
FIG. 2 is a general block diagram illustrating an alternative implementation of the audio communication circuit.

FIG. 2 is a diagram illustrating an alternative implementation of the audio communication circuit for conditions in which the signal level differences between the Tx and Rx signals are smaller (i.e. closer to being at the same level). This circuit includes two matched input stages, each including a transducer 40, 42 and an amplifier 44, 46. Each of the input stages operates as described above in FIG. 1. Note, however, that the transducers 40, 42 are connected with opposite polarity with respect to each other so that the transmit signals in each input stage are approximately 180 degrees out of phase with each other. The impedance of the input stages is balanced so that the receive signals on each side are substantially equal in magnitude and in phase, and the transmit signals are substantially equal in magnitude but 180 degrees out of phase.

The circuit also includes a differential amplifier 48, which receives the combined transmit and receive signals as input and simultaneously adds the transmit signals and cancels the receive signals. Ideally, the output of the differential amplifier is proportional to the difference between the two input signals. Since the receive signals are substantially in phase, they should cancel each other. The extent to which the receive signals cancel each other depends on the matching of the input stages. Ideally, the impedances of the input stages are matched; however, in practice, it is difficult to achieve a perfect balance due to variations in the devices. Therefore, the receive signal will be substantially canceled at the output of the differential amplifier 48 if the input stages are matched, but not entirely canceled. It is also important to note that the impedance of the source of the receive signals can and often does fluctuate, and this can lead to phase differences in the impedance in each input stage.

It should be noted that it is not necessary to use a transducer on each side to achieve canceling of the receive signal using the differential amplifier. One of the transducers can be replaced by matching impedance device such as an inductor or RLC circuit that has the same impedance characteristics as the transducer. When a matching impedance device is used in place of a transducer, the side without the transducer obviously does not generate a transmit signal, but it is coupled to the source of the receive signal and behaves similarly to the other side of the differential configuration. The differential amplifier 48 substantially cancels the receive signals from each side and amplifies the transmit signal from the side with the transducer.

While each input stage in the differential configuration does not require a transducer, there are some advantages to using the same type of transducer in each input stage. One advantage is that the user can experiences more realism and presence. For example, in implementations where the matching transducers are earphones in each ear, the two earphones allow the user to hear audio output in both ears. If the transducers are implemented as speakers, such as in a desktop speaker phone, the speakers can be arranged to increase the audio output. The transmit signal output from the circuit is greater because the differential amplifier adds signals with opposite polarity at each input, approximately doubling the transmit signal. In addition, it is easier to achieve impedance and phase matching by using the same model of transducer on each side.

In general, this circuit configuration has a similar effect as the circuit in FIG. 1 in that it simultaneously increases the transmit signal while reducing the receive signal. However, in cases where the separation between the Tx and Rx signals is substantial, it is necessary to use a combination of both a compressor-expander and a differential amplifier to cancel the Rx signal in the combined Tx-Rx signal more effectively. The Tx signal induced in the transducer by voice input is much less than the Rx signal received from a standard telephone line. The compressor-expander reduces this separation between the Tx and Rx signals so that the differential amplifier is more effective in canceling the common mode Rx signals relative to the Tx signal.

Figure 3:
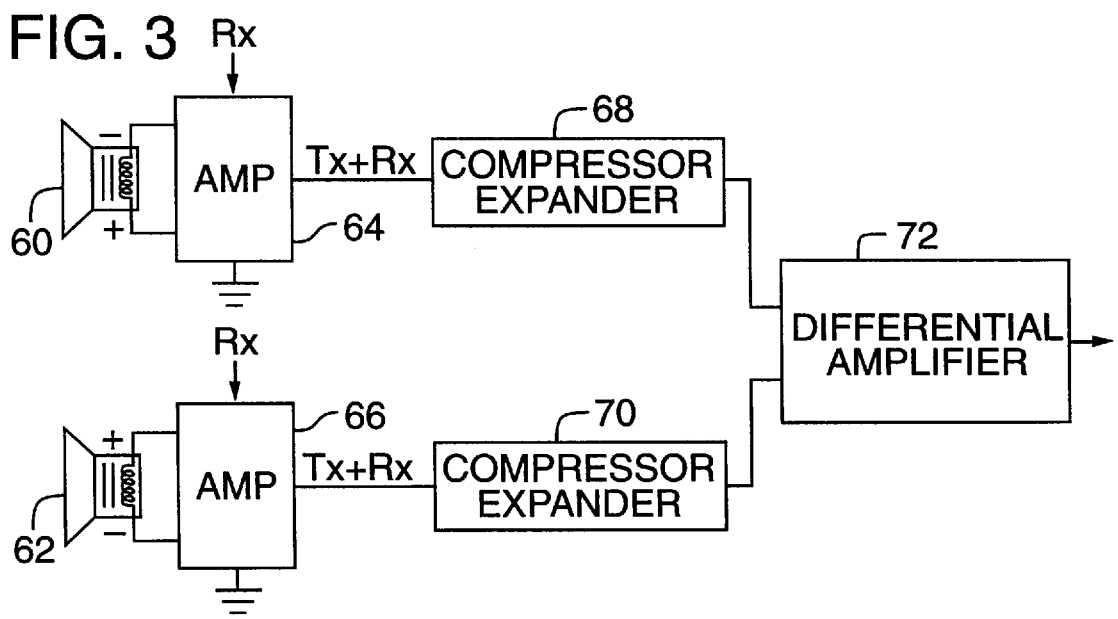
FIG. 3 is a general block diagram illustrating another alternative implementation of the audio communication circuit.

FIG. 3 is a block diagram illustrating another alternative implementation of the audio communication circuit. This circuit combines the features of the circuits in FIGS. 1 and 2 in that it uses both a differential amplifier and compressor-expanders to simultaneously compress the receive signal and increase transmit signal. The differential configuration in this circuit includes two input stages with matching impedance. The input stage on each side includes a transducer (60, 62) and an amplifier (64, 66). These components operate in the same fashion as the input stages shown in FIG. 2, and require no further elaboration here. Each side of the differential configuration also includes a compressor-expander (68, 70), which simultaneously compresses the receive signal and expands the transmit signal. The differential amplifier 72 receives a combined transmit and receive signal (Tx+Rx) from each side, cancels the receive signals against each other, and adds the transmit signals.

The circuit in FIG. 3 provides better performance than the circuits in FIGS. 1 and 2 because the differential configuration and compressor-expanders are combined to provide better cancellation of the receive signal and amplification of the transmit signal. As in the circuit of FIG. 2, it is preferable but not necessary to have transducers on each side. One side can be replaced with a matching impedance device. In this case, the side with the matching impedance device has a compressor in place of a compressor-expander because there is no transmit signal generated on this side.

Each of the circuits in FIGS. 1–3 include an audio processing circuit coupled to a transducer for receiving a combined signal, including Tx and Rx signal components, and for simultaneously expanding the Tx signal component and compressing the Rx signal component. The degree to which the audio processing circuit is capable of producing a Tx signal greater than the Rx signal, while substantially canceling the Rx signal, depends on the relative levels of the Tx and Rx signals at the transducer as well as the specific configuration of the audio processing circuit. In FIG. 1, the audio processing circuit comprises the compressor-expander circuit 24, which is particularly effective in reducing the difference between the Tx and Rx signals when the Tx signal is significantly smaller than the Rx signal. However, a compressor-expander by itself is not sufficient to make the Tx signal larger than the Rx signal and effectively cancel the Rx signal because the Tx signal produced in the transducer is typically quite small.

In FIG. 2, the audio processing circuit comprises the differential amplifier 48, which is particularly effective in canceling the Rx signal relative to the Tx signal when the two input stages of the differential amplifier are well-matched and the separation between the Tx and Rx signals is less significant. However, the differential amplifier alone will not be particularly effective unless the Tx and Rx signal levels are closer together.

Finally, in FIG. 3, the audio processing circuit comprises the combination of the compressor-expanders 68, 70 and the differential amplifier 72. The audio processing circuit in FIG. 3 more effectively cancels the Rx signal relative to the Tx signal because the compressor-expanders reduce the difference between the Tx and Rx signals first, and then the differential amplifier substantially cancels the common made Rx signals. More detailed implementations of the audio processing circuits in FIGS. 1–3 are described below.

Figure 4:
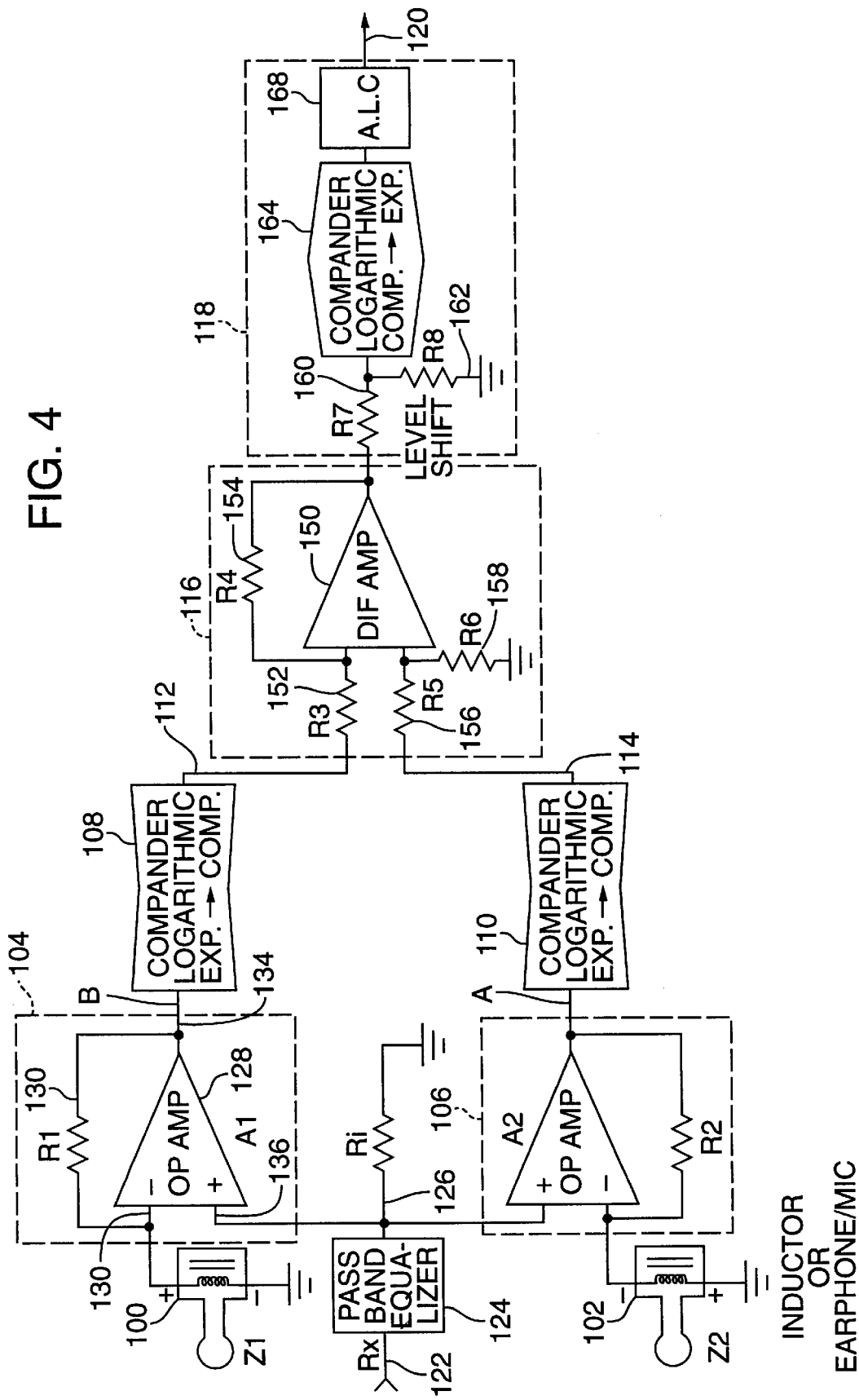
FIG. 4 is a schematic diagram illustrating a detailed implementation of a full duplex audio communication circuit.

FIG. 4 is a diagram illustrating a detailed implementation of a full duplex audio communication circuit. Like the circuit shown in FIG. 3, this circuit uses both a differential configuration and compressor-expanders to simultaneously expand the transmit signal from the transducer and decrease the receive signal from an external source. Each side of the differential configuration includes a transducer 100, 102, an amplifier 104, 106, and a compressor-expander 108, 110. The outputs 112, 114 of the compressor-expander on each side of the differential configuration are coupled to a differential amplifier circuit 116. The output of the differential amplifier circuit 116 is coupled to an output stage 118, which further expands the transmit signal, compresses the receive signal, and adjusts the voltage level of the output to a relatively uniform level. The output stage 118 generates a final transmit signal 120 as well as a substantially diminished receive signal which is at least 30 dB below the transmit signal level. By simultaneously compressing the receive signal and expanding the transmit signal, this circuit is achieves full duplex performance with minimal feedback.

The input receive signal 122 enters the circuit at a pass band equalizer 124. In this particular configuration, the pass band equalizer is implemented using a conventional two-pole pass band equalizer circuit. The pass band equalizer 124 equalizes the audio output at the transducer 100, 102. In particular, the frequency response of the receive signal tends to decrease at higher frequencies. To equalize the frequency response of the receive signal, the pass band equalizer has a reactive circuit that offsets and balances the frequency response of the receive signal.

The output 126 of the pass band equalizer 124 is applied to the amplifiers 104, 106 on each side of a differential configuration. FIG. 4 illustrates one way to apply the receive signal to the transducer using an amplifier without loading or shunting the transducer 100. In this implementation, the amplifier 104 includes an op amp 128 with a resistor R1 130 coupled across the inverting input 132 and the output of the op amp 134. Any of a variety of conventional op amp circuits can be used to implement the circuit, including but not limited to LM324 or TL084 op amps. This applies to op amps used in other embodiments as well. After passing through the pass band equalizer, the receive signal enters the non-inverting input 136 of the op amp. The inverting input 132 of the amplifier is coupled to the transducer 100, and the other side of the transducer is coupled to ground.

Since the current mirror bias of the op amp 128 acts like a current source, the op amp 128 receives the Rx signal at its non-inverting input and drives the Rx signal into the transducer 100 through its inverting input 132. The inverting input 132 is at virtual ground, meaning its voltage with respect to ground is approximately zero. Since the virtual ground cannot sink current, all of the input current from the Rx signal is forced through R1 130. The voltage gain of the amplifier 104, therefore, equals –R1/Z1. The negative sign denotes the phase inversion between the input and the output of the op amp. Also, because the inverting input is at a virtual ground, the input impedance of the amplifier is equal to Z1, the impedance of the transducer 100. Because of this unique method of driving the transducer 100 without loading or shunting it, the amplifier transfers the small electrical signal transduced from the audio input of the transducer (approximately 300 microvolts) with negligible loss to the output 134 of the op amp.

The amplifier 106 on the other side of the differential configuration has the same design as the amplifier 104 on the other side. However, the transducer 102 is connected to the amplifier 106 with an opposite polarity relative to the transducer 100 on the other side of the differential configuration. This enables the differential amplifier circuit 116 to approximately double the transmit signal received from each side of the differential configuration. It is important to note that, as explained above, the transducer 102 can be replaced with a device such as an inductor that matches the impedance of the transducer 100 on the other side of the differential configuration. When a matching impedance in place of the transducer 102, this side of the circuit includes only the receive signal, and therefore, the expander portion of the compressor-expander 110 is not necessary.

The transducers 100, 102 are depicted as earphones in FIG. 4 because this circuit is particularly well suited for a portable communication device with earphones. The audio communication circuit shown here can also use speakers, instead of earphones, for an application such as a desktop speaker phone. Whether the circuit is used in a portable device with earphones or as a desktop speaker phone, the transducers should preferably have a relatively high impedance so that they generate a larger Tx signal in response to voice input. Speakers with 100Ω and 600Ω impedance and other high impedance transducers are available from Kobitone Audio Co. and possibly other manufacturers. Kobitone Audio Co. also makes high impedance earphones. While I have referred to a specific type of transducer, it is important to emphasize that a number of alternative transducers including either earphones and speakers can be used to implement the invention. This applies to the implementation of FIG. 4 as well as the other implementations described and illustrated in this document.

In the context of speaker phone applications, one design consideration is the geometric orientation and polarity of the speakers. Consider a speaker phone application based on the circuit and FIG. 4. Since the speakers have opposite polarity, the acoustical outputs from each speaker can tend to cancel each other. One way to avoid this canceling is to place the speakers back to back (pointed in opposite different directions/180 degrees apart). This is an adequate solution for applications where the user is most often in front of the speaker phone, but it does tend to produce a "null" or dead zone along a plane perpendicular to the direction of both speakers and passing through the midpoint between the speakers.

Another solution is to connect the second speaker (102) between point A and ground in FIG. 4 with the same polarity as the first speaker (100). Since the speakers have the same polarity, this alternative design avoids the problem of having one speaker's output cancel the other speaker's output. However, when connected at point A at the output of the op amp in the amplifier 106, the transducer sees a load of the op amp's output impedance. This loading essentially prevents the transducer from producing a Tx signal on this side (point A) of the differential amplifier. However, this configuration does have the advantage of increasing the acoustical output because both transducers still convert the receive signal to an audio output signal. These issues regarding the positioning and polarity of speakers apply to other implementations described further below. However, the issue is not particularly relevant to applications using earphones since the audio output from each earphone is acoustically isolated from the other.

The output signals of the amplifiers 104, 106 are fed to identical compressor-expanders 108, 110 at each side of the differential configuration. In implementation shown here, the compressor-expanders are implemented using a conventional compander IC. Compander circuits are available from a number of manufacturers including Toko Semiconductor (Compander IC TK 10651M), Sanyo Electric (LA8632M) and Motorola, Inc. (MC33110). The compressor-expanders are each configured to compress the larger receive signals and to expand the smaller transmit signals. After being amplified in the amplifiers 104, 106, the receive signals are fifteen to thirty times larger that the transmit signals generated from the audio input at the transducer. As such, the receive and transmit signals at the input of the compressor-expanders 108, 110 have approximately a 20:1 ratio. The compander in this implementation logarithmically compresses the receive signal and expands the transmit signal such that the ratio of the receive signal to transmit signals at its output is reduced to approximately 6:1.

The differential amplifier circuit 116 receives the output of the compressor-expanders (at nodes 112 and 114) and produces an output signal where the transmit signal is larger than the receive signal. The differential amplifier circuit 116 in this implementation comprises a differential amplifier 150 and resistors R3, R4, R5, and R6 (152–158). Resistors R3 and R5 are coupled between respective outputs of the compressor-expanders and the two inputs of the differential amplifier 150. Resistor R4 is coupled between one of the inputs and output of the differential amplifier, while resistor R6 is coupled between the other input and ground.

The larger receive signals are fed as common mode to the differential amplifier circuit which causes the net cancellation at the output to be approximately 30–40 dB below the original levels at the input. Being almost doubled by the compressor-expanders, the smaller transmit signals are further doubled in the differential amplifier since these signals are opposite in polarity with respect to each other. The differential amplifier output produces a combined transmit and receive signal where the transmit portion of the signal is 20–30 dB greater than the unwanted receive portion of the signal.

The output signal of the differential amplifier circuit 116 is fed to a level shift circuit in the output stage 118. Comprising resistors R7 and R8 160, 162, the level shift circuit is used in this implementation to adjust the level of the signal at the input of another compressor-expander 164. This particular compressor-expander 164 further expands the transmit signal and compresses the receive signal. Since the level of the transmit signal is greater than the receive signal at this point, the compressor expander 164 in the output stage is set to produce larger signals above a given threshold voltage level, and produce smaller signals below a given threshold level. The level shift circuit ensures that the input of the compressor-expander is at the proper level so that the compressor-expander operates properly.

In this particular implementation the compressor-expander 164 is also implemented using a conventional compander IC. This compander produces a greater separation between the Tx and Rx signals. In this part of the circuit, the compander increases the difference between Tx and Rx whereas, at the input stage, the compander decreases the difference between the Tx and Rx signals. As a result of this simultaneous compressing and expanding, the resulting output signal contains only a negligible receive signal, i.e., the transmit signal portion is approximately 35–40 dB greater than the receive signal portion. Therefore, any feedback of the receive signal to the output of the transmit channel is almost entirely eliminated.

The output stage 118 also includes an automatic level control circuit 168 which receives the output of the compressor-expander 164 and adjusts it to a relatively uniform output level. This automatic level control is particularly useful in telephone communication applications where the transmit signal should preferably be relatively uniform at about −5 dBm.

The full duplex communication circuit shown in FIG. 4 has a number of advantages. The unique configuration of the op amp relative to the transducer prevents any loading or shunting of the transducer. As a result, the amplifier transfers the small electrical signals transduced from audio input to its output with negligible loss. In addition, the prevents the receive signal from interfering with the transmit signal without shunting the receive signal, which would decrease the power of the receive signal and make it more difficult for the user to hear. Another advantage of this circuit is that it combines the use of compressor-expanders and a differential configuration to substantially cancel the receive signal from the output of the communication circuit. The companders and the differential amplifier simultaneously increases the transmit signal and compresses the receive signal such that feedback is almost entirely eliminated.

The full duplex communication circuit shown in FIG. 4 is particularly well suited for use in a head-set where the transducers act as both earphones and microphones. When the transducers are implemented in earphones, the circuit requires less power to create an audible signal because earphones are positioned in close proximity to the user's ear. The circuit can also be implemented in a speaker phone where the transducers are implemented in speakers that serve the dual function of converting the receive signal into audio output and transducing audio input into the transmit signal. However, when the circuit is implemented in a speaker phone, more power is needed to generate audio output at a sufficient level for the user to hear while standing away from the speaker. In addition, the transducer has to be capable of generating a sufficient transmit signal even when the audio input is originating from a source a few feet away.

One way to make the communication circuit shown in FIG. 4 operate more effectively higher power applications is to use additional transducers. The combined audio output from these transducers is easier to hear and the transmit signal generated in each of these transducers can be combined to create a larger composite transmit signal by utilizing more area of acoustical energy being imposed upon multiple transducers which maintain the same electrical gain. Note that using multiple transducers in this fashion increases the Tx signal without increasing the loop gain.

Figure 5:
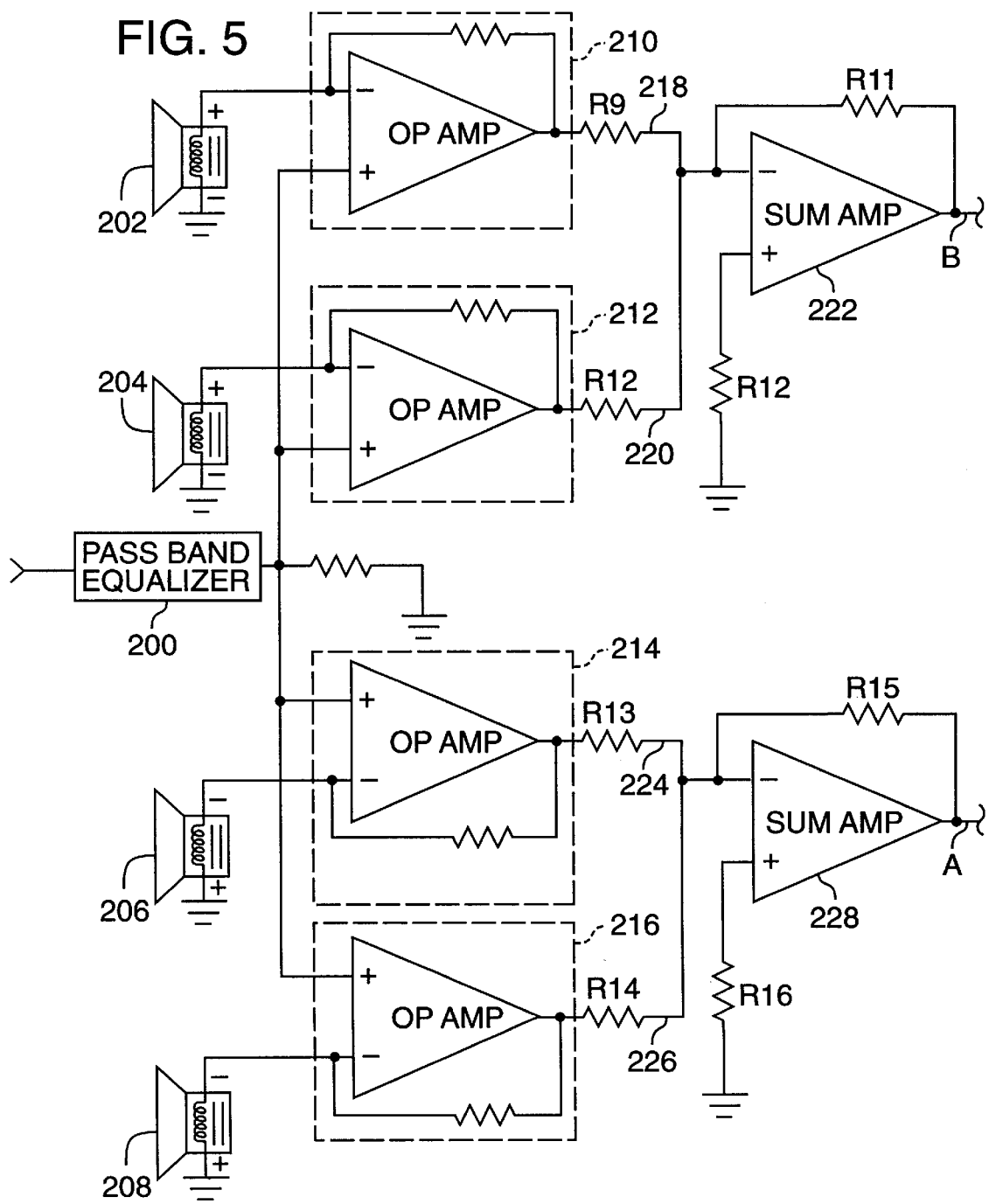
FIG. 5 is a schematic diagram illustrating how more than one transducer can be used on each side of a differential configuration similar to the one shown in FIG. 4 for higher power applications.

FIG. 5 is a schematic diagram illustrating how multiple dual purpose transducers can be combined for higher power applications. In this circuit, the input stages are similar to the input stages shown in FIG. 4, except that an additional transducer is connected in each side of the differential configuration. The receive signal from an external source enters the circuit at the pass band equalizer 200, which equalizes the frequency response of the signal. The receive signal is then fed to amplifiers 210, 212, 214, 216 having the same configuration as the amplifiers shown in FIG. 4.

Each transducer 202, 204, 206, 208 is coupled to a corresponding amplifier 210, 212, 214, 216 in the same way that the transducers are coupled to the amplifiers in the input stages shown in FIG. 4. On each side of the differential configuration, the output of the amplifiers (210, 212 for example) are coupled together through resistors at the output of the amplifier (R9 and R12; 218 and 220, for example). The combined output of the amplifiers is fed to the inverting input of a summing amplifier 222. The summing amplifier is comprised of an op amp with a first resistor R11 coupled across its inverting input and output, and another resistor R12 coupled between its non-inverting input and ground. The summing amplifier can combine multiple inputs at a time because of the virtual ground at the inverting input of the op amp. In this configuration, the summing amplifier generates an output equal to the sum of these multiple inputs, amplified by an amount equal to the gain of the summing amplifier.

The other side of the differential configuration is implemented in an identical manner. The output of the amplifiers 214, 216 on the other side of the differential configuration are coupled through resistors R13 and R14 to the inverting input of an op amp in the summing amplifier 228. Resistors R15 and R16 are coupled in the same manner as resistors R11 and R12 on the other side of the differential configuration.

The front end stage is designed to be coupled to a differential amplifier. Preferably, the remainder of the circuit and its operation are implemented as shown in FIG. 4. To simplify the drawing, the outputs of the summing amplifiers 222, and 228 are labeled with the letters A and B to correspond with nodes A and B in FIG. 4. The front end stage shown in FIG. 5 can replace the front end stage shown in FIG. 4 to the left of the nodes labeled A and B.

The use of multiple transducers as shown in FIG. 5 is advantageous for speaker phone applications because the output of each of the transducers is combined to produce a composite audio output that is easier to hear. In addition, the electrical signals transduced from audio input in each of the speakers can be combined to create a larger transmit signal. To add even more transducers, additional pairs of amplifiers and transducers can be combined as shown in FIG. 5. By employing multiple transducers, the circuit can generate increased acoustic power and can achieve increased acoustical geometrical sensitivity. Moreover, low power op amps (milliwatt) can effectively process the receive signal and the transmit signal generated in the transducer.

Figure 6:
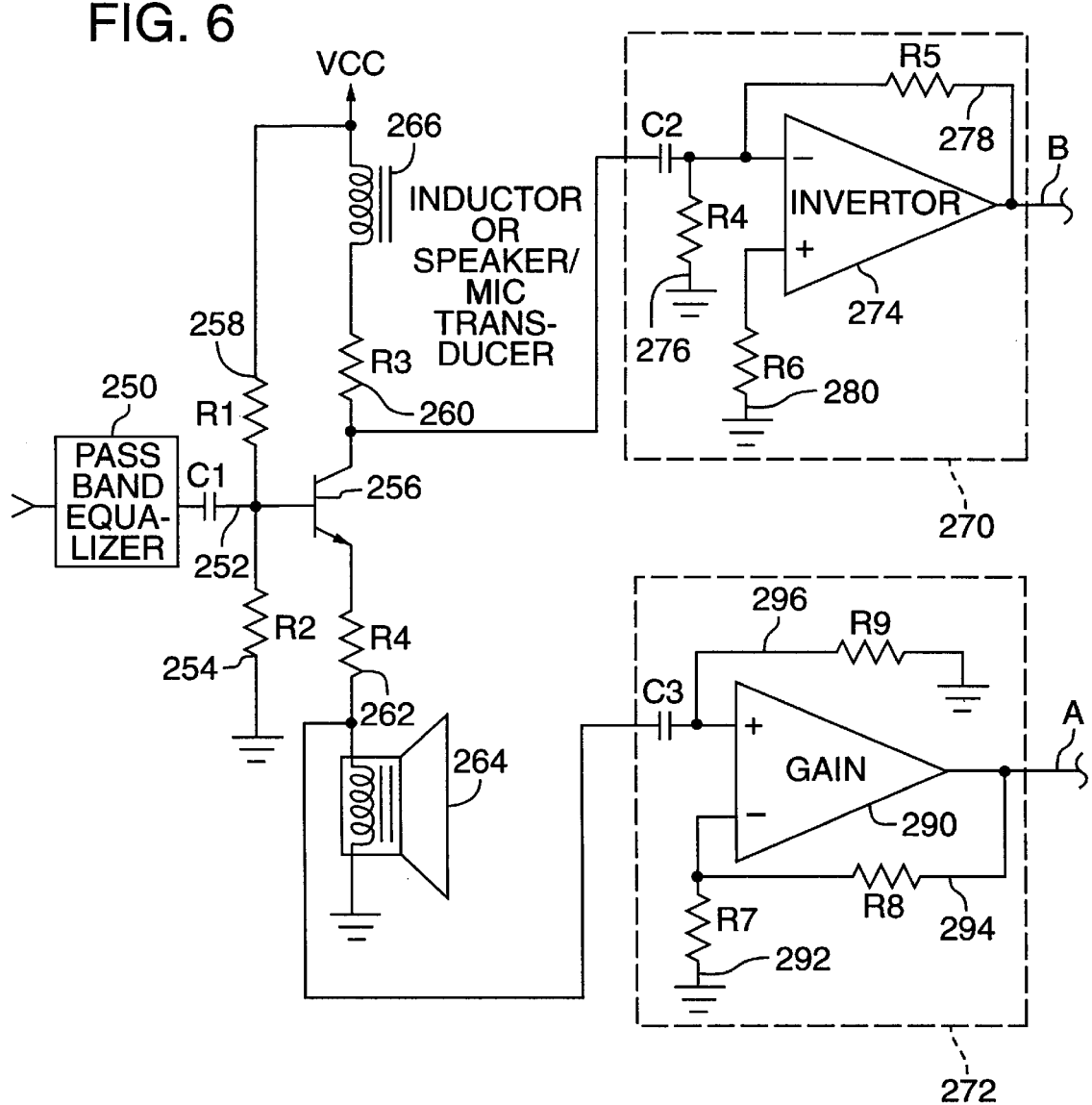
FIG. 6 is a schematic diagram illustrating another implementation of a full duplex audio communication circuit.

FIG. 6 is a schematic diagram illustrating another implementation of a full duplex audio communication circuit. This circuit has a front end utilizing a transistor to serve two functions: 1) it drives a transducer with the receive signal from a remote source; and 2) it amplifies the transmit signal generated in the transducer from audio input. This receive signal enters the circuit at a pass band equalizer 250, which balances the frequency response of the signal. The output of the pass band equalizer passes through a capacitor C1 252. Resistor R1 (258) and R2 (254) form a voltage divider that provides the necessary bias voltage for transistor 256. The capacitor couples the output of the pass band equalizer 250 to the input mode of a common emitter configuration of a bipolar junction transistor 256.

The transistor amplifier, in this implementation, includes an NPN transistor 256 and four resistors R1, R2, R3, and R4 (258, 254, 260, 262). The transistor amplifier is connected between a supply voltage, $V_{CC}$, and ground. Resistor R1 is coupled between the supply voltage and the base of a transistor, and resistor R2 is coupled between the base of the transistor and ground. The emitter is coupled through resistor R4 to the output of a transducer 264. On the collector side, the collector is coupled to a matching impedance device or transducer 266 through resistor R3. The transducer or matching impedance device 266 at the collector is coupled between the supply voltage and resistor R3 260.

The impedance at the collector and emitter of the transistor is balanced so that the transistor can generate two corresponding outputs at the collector and emitter, where each output produces a receive signal that is out of phase with the other. The receive signals at each output are out of phase because the transistor acts like an invertor to the signal applied to in the input of a common emitter configuration. One of the outputs is inverted so that the resulting signals each include in phase receive signals. These signals can then be applied to differential amplifier to cancel the receive signal. The matching impedance in the collector can be implemented using either a transducer identical to the transducer 264 at the emitter or a device with matching impedance of the transducer 264.

The communication circuit shown in FIG. 6 uses the transistor as an amplifier in both a common emitter and a common base configuration. The current gain for both the common emitter and common collector configuration is equal to the beta of the transistor. Similarly, the voltage gain for both the common emitter and common base configuration is equal to the collector impedance divided by the emitter impedance. ($R_C/R'_E$). In the context of bipolar transistors, the term "common" refers to the terminal of the transistor that is common to both the input and output. Thus, in a common emitter configuration, the emitter terminal is common to both the input and output. Similarly, in a common base configuration, the base terminal is common to the input and output. In a common emitter configuration the input node is the base of the transistor, and the output node is the collector. In a common base configuration, the input node is the emitter of the transistor, and the output node is the collector.

The transistor amplifier shown in FIG. 6 amplifies the receive signal using the common base configuration. The transistor 256 amplifies the current of the receive signal applied to the base by an amount equal to the current gain of the transistor. The voltage across the transducer 264 is approximately equal to the receive signal voltage, less the threshold voltage drop from the base to the emitter (approximately 0.7 volts) and the voltage drop across resistor R4.

The transducer 264 converts audio input into a transmit signal at the output of the transducer. This transmit signal is applied to the input of the transistor 256 in a common base configuration. As such, the transmit signal receives a voltage gain equal to the voltage gain for the common emitter configuration.

The amplifier configuration shown in FIG. 6 provides an effective way of driving the transducer with little loading. Any load applied to the transducer can reduce the transmit signal substantially since the transducer generates very small electrical signals from the audio input. Therefore, a significant advantage of this configuration is the way it drives the transducer without little loading. Another benefit of this configuration is that the transmit signal receives a significant amount of amplification due to the voltage gain of the amplifier.

The two outputs of the transistor amplifier in FIG. 6 are fed to opposite sides of a differential configuration. The output for one side of this differential configuration is taken from the collector of the transistor 256 and is applied to an inverter 270. The inverter inverts the transmit and receive signal portions so that: 1) the transmit signals on each side of the differential configuration are out of phase, and 2) the receive signals on each side are in phase. The receive signal at the collector of the transistor 256 is out of phase with the receive signal at the base of the transistor because the transistor acts as an inverter, as noted above. Therefore, in order to make the receive signal equal and in phase on each side of the differential configuration, the receive signal output at the collectors needs to be inverted.

The output for the other side of the differential configuration is taken at the output of the transducer 264. At this output node, the receive signal is in phase with the receive signal applied to the input of the transistor, but is out of phase with the output of the transistor at its collector. The transmit signal generated by the transducer 264 is in phase with the transmit signal at the output of the transistor.

The combined transmit and receive signal at the output of the transducer is applied to a linear amplifier 272 having a gain equal to the gain of the inverter 270. This linear amplifier 272 amplifies the combined transmit and receive signal and provides its output to the other side of the differential configuration.

In this implementation, the inverter 270 is implemented using an op amp and resistors R4, R5, and R6 (270, 278, and 280). The gain of the inverter is equal to R5/R4. The linear amplifier 272 is implemented similarly, except that the input is applied to the non-inverting input of an op amp 290. The linear amplifier 272, which includes an op amp 290, and resistors R7, R8, and R9 (292, 294, and 296), has a gain equal to R8/R7.

The outputs of the inverter 270 and linear amplifier 272 are applied to a differential amplifier which adds the transmit signal from each side together and substantially cancels the receive signal. To achieve better performance, the outputs of the inverter and linear amplifier are applied to identical compressor-expander circuits that simultaneously compress the receive signal and expand the transmit signal. One way to implement this is to apply the outputs of the inverter and linear amplifier to the compressor-expander 108, 110 shown in FIG. 4 at nodes labeled A and B. The remainder of the communication circuit can be implemented identically to the circuit shown in FIG. 4.

Figure 7:
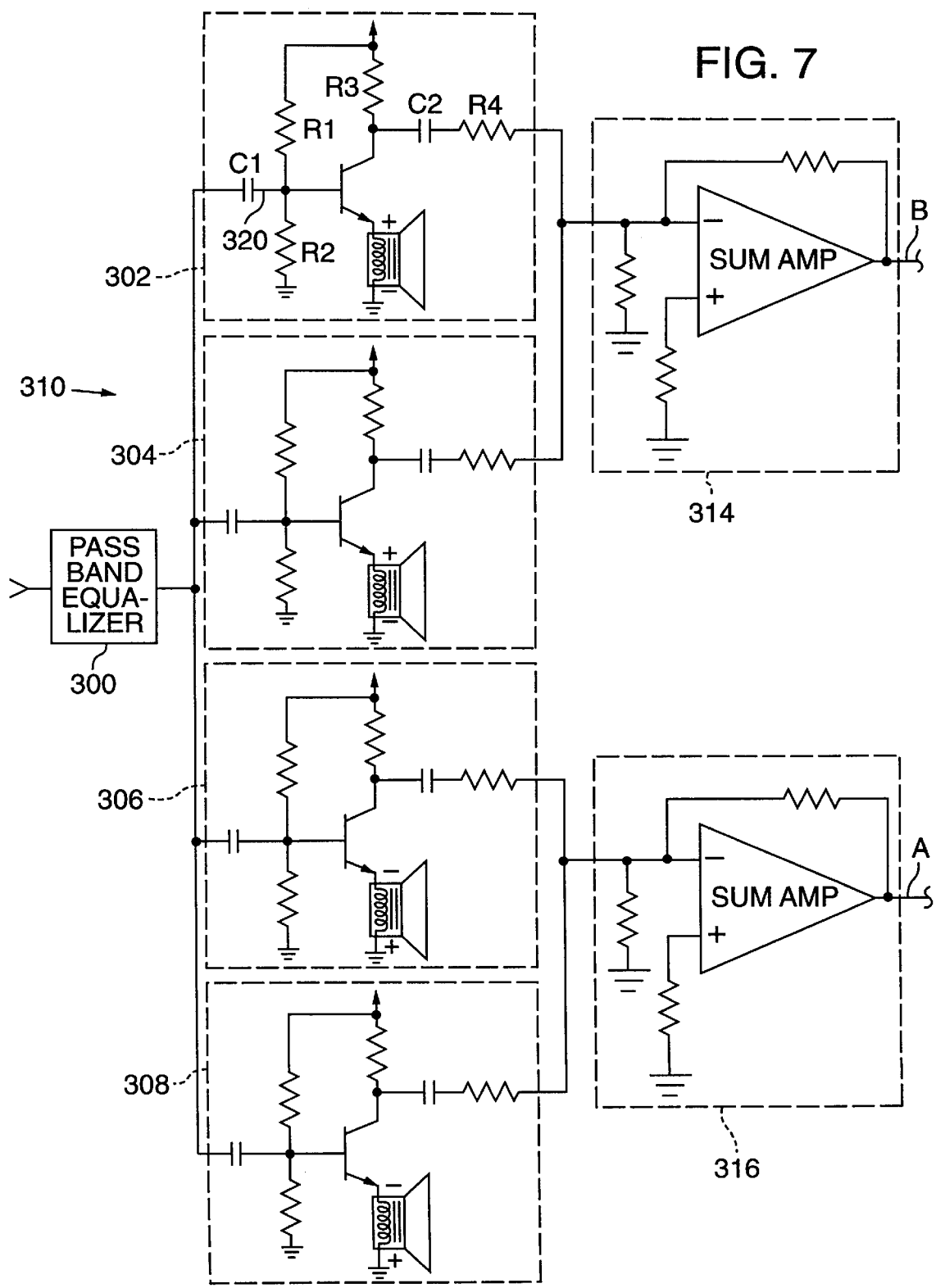
FIG. 7 is a schematic diagram illustrating how more than one transducer can be used on each side of a differential configuration similar to the one shown in FIG. 6 for higher power applications.

FIG. 7 is a schematic diagram illustrating how more than one transducer can be combined for larger power applications. In this circuit, each transducer is paired with a transistor amplifier using similar configuration to the one shown in FIG. 6. Rather than using a single transistor with a matching impedance at the collector and emitter, this circuit uses complementary pairs of input stages on each side of the differential configuration (for example, 302 is complementary to 306, and 304 is complementary to 308). Each input stage includes a transistor amplifier and a transducer coupled to the amplifier at the emitter of the transistor. Each input stage on one side of the configuration includes a complementary input stage on the other side of the configuration. Additional input stages can be added to each side of the differential configuration by using a summing amplifier 314, 316 to add the outputs of each input stage.

In this implementation, an input stage (e.g., 302) is connected in a common emitter configuration with respect to the receive signal and in a common base configuration with respect to the transmit signal induced in a transducer. The configuration and operation of an input stage is similar to the transistor amplifier in the input stage shown in FIG. 6. However, since there is a complementary front end stage on the other side of the differential configuration there is no need for a matching impedance device in the collector to balance the impedance of the transducer at the emitter.

The receive signal enters an input stage through capacitor C1 320 and passes to the input node of the base of the transistor. A first resistor R1 is coupled between $V_{CC}$ and the base, and a second resistor R2 is coupled between the base and ground. A third resistor is connected between $V_{CC}$ and the collector. The output of the transistor is provided at the collector, which is coupled to the input of a summing amplifier through capacitor C2 and resistor R4. The design of each of the other input stages is identical except that the input stages 306, and 308 on the other side of the differential configuration have a transducer coupled with the opposite polarity.

This full duplex circuit has similar advantageous to the circuit shown in FIG. 5 in that it can achieve greater acoustical geometric sensitivity and produce a higher power output. In addition, the use of multiple transducers also allows the circuit to generate a much larger transmit signal. The combination of transducers in a number of input stages also allows lower power transistors to be used as amplifiers.

Figure 8:
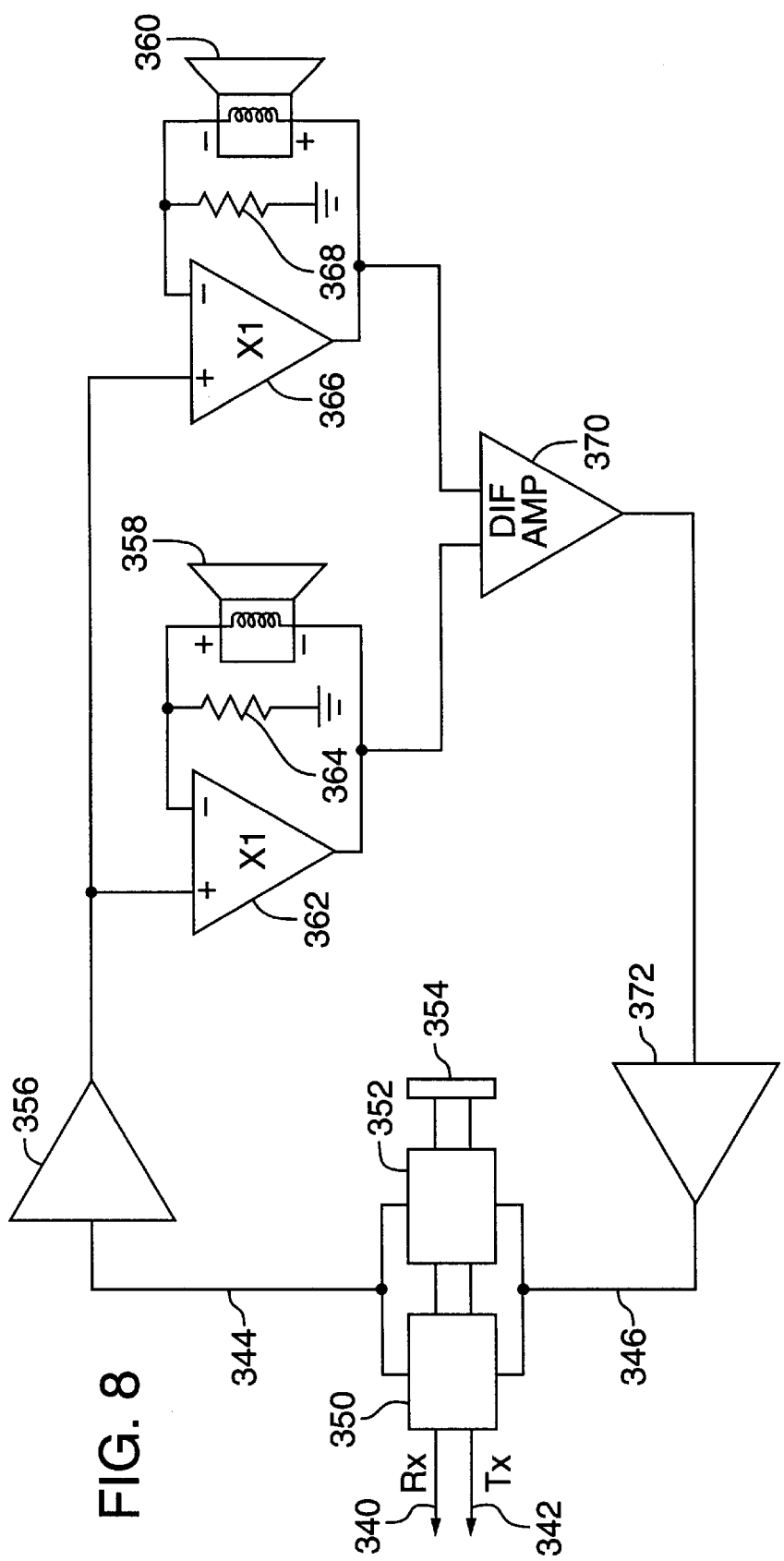
FIG. 8 is a schematic diagram illustrating another implementation of a full duplex audio communication circuit.

FIG. 8 is a schematic diagram illustrating another implementation of a full duplex audio communication circuit. This circuit uses a pair of conventional hybrid transformers 350, 352 to connect the receive side of the communication circuit to a receive wire 340 carrying an incoming signal from a remote source and to connect the transmit side 346 of the circuit to the transmit wire 342 carrying the outgoing signal. The transmit and receive wires simultaneously carry the transmit and receive signals. The pair of hybrids 350, 352 are coupled together and to a balancing impedance 354 so that the transmit and receive parts (344 and 346 respectively) of the communication circuit are substantially isolated from each other. When the transmit signal is applied to the pair of hybrids, an equal but opposite signal is induced in each hybrid. As a result, the transmit signal is transferred to the transmit wire 342 but is substantially isolated from the receive side. Similarly, the receive signal entering via the receive wire 340 is transferred to the receive side 344 of the circuit but is substantially isolated from the transmit side 346.

The receive part of this circuit amplifies the receive signal and feeds it to a pair of input stages coupled in a differential configuration. The receive part of the circuit includes an amplifier 356 that amplifies the receive signal from the pair of hybrids and applies it to each of the input stages. In this particular implementation, the amplifier 356 is a generic op amp configured as a linear voltage amplifier. However, a variety of convential amplifier circuitry can be used as well.

While not shown specifically in FIG. 8, it is possible to add an expander circuit, similar to the ones described above, between the hybrid transformers and the amplifier 356. The expander can be used to increase the separation between the Rx signal and the Tx signal (leaked from the Tx side through the hybrid transformers). In some applications, the incoming Rx signal can drop fairly low due to attenuation on the communication lines. At the same time, the Tx signal leaked to the Rx side may be higher due to the failure of the hybrids to provide sufficient isolation. Because of these issues, it can be useful to use a expander (e.g., one from the compander IC) to increase the separation between Rx and Tx by using it to expand the Rx signal.

Each input stage includes a transducer coupled to amplifier that transfers the receive signal to the transducer without loading it. The configuration of the input state shown in FIG. 8 demonstrates another way to drive the transducer with the receive signal while minimizing loading. It is important to note that this particular circuit for driving the transducer can also be used in place of the design shown in the input stages of FIGS. 4 and 5, for example. In the input stages shown in FIG. 8, the amplifiers are each implemented with an op amp 360, 362 with a resistor coupled between ground and the inverting input of the op amp. The receive signal is fed to the non-inverting input of the op amps, which are configured as voltage to current converters. The transducers are coupled between the output of the transducer and the inverting inputs of the op amps. The transducers are coupled with opposite polarity on each side of the differential configuration so that the transmit signal produced at the output of the input stages is equal but has opposite polarity. Conversely, the receive signal produced at the output of the input stages is roughly the same, assuming both sides of the differential configuration are balanced. The input stages each generate a combined signal including the transmit and receive signals, except the transmit signals are out of phase.

The combined signals from each input stage are fed into a differential amplifier 370, which substantially cancels the receive signal and approximately doubles the transmit signal. The differential amplifier communicates its output signal to an amplifier 372, which amplifies the signal further. The amplifier 372 is implemented using a generic op amp configured as a linear voltage amplifier. Since a 600Ω transducer is used in this implementation, the amplifier 372 should be capable of driving a 600Ω load. The signal at the output of the amplifier 372 primarily comprises an amplified transmit signal and a small portion of the receive signal.

The extent to which this circuit eliminates feedback depends on the isolation between the transmit and receive side using the hybrid transformers and the amount of cancellation of the receive signal achieved using the differential amplifier. Consider an example where the incoming signal on the receive wire is about 30 mV due to attenuation along the incoming wire and the outgoing signal on the transmit wire is approximately 300 mV. The table below describes the signal levels at various points in the circuit in a first case, where the receive side amplifier has a gain of 100, and in a second case, where the receive side amplifier has a gain of 50.

| Location in Circuit | Gain of 100 | Gain of 50 |
| --- | --- | --- |
| Output of receive side amplifier 356 | Rx = 3 V | Rx = 1.5 V |
| Output of each input stage | Rx = 3 V; Tx = 15 mV | Rx = 1.5 V; Tx = 15 mV |
| Output of Dif. Amp 370 (assuming decrease of receive signal of 30 dB) | Rx = 100 mV; Tx = 30 mV | Rx = 50 mV; Tx = 30 mV |
| Output of transmit side amplifier 372 | Rx = 1 V; Tx = 300 mV | Rx = 0.5 V; Tx = 300 mV |
| Transmit Wire | Rx = 1 V; Tx = 300 mV | Rx = 0.5 V; Tx = 300 mV |
| Feedback of Receive Signal to Transmit side (Assuming approximately 30 dB isolation) | Rx = 33 mV | Rx = 16.6 mV |

Note that in this circuit, there is some feedback and the feedback increases with the gain of the receive side amplifier. Also, the extent of the feedback depends in part on the isolation achieved using the pair of hybrid transformers with a balancing impedance. Thus, the performance will vary depending on how well the balancing impedance matches to the characteristic impedance of the communication line.

In some speaker phone applications, the communication circuit may need to produce a larger audio output. For example, if implemented in a speaker phone designed to be used in larger rooms, the user may want the speaker phone to produce a larger audio output of the Rx signal. This can present a problem in full duplex operation because increasing the gain on the Rx signal makes it more difficult to effectively reduce the Rx component from the Tx signal. One way to address this problem is to add additional transducers as microphones to create additional sources of the Tx signal. These new sources of the Tx signal can be added to together to effectively augment the final Tx signal output from the circuit One problem with this approach is that the additional microphones will receive both voice signals as input as well as part of the audio output from the dual-purpose speaker/microphones in the device. As such, the signals produced by the additional microphones will include both: 1) the voice input signal; and 2) a signal attributable to the output of the dual speaker/microphones. In order to effectively augment the Tx signal relative to the Rx signal, the circuit has to try to remove signals of type 2.

Figure 9:
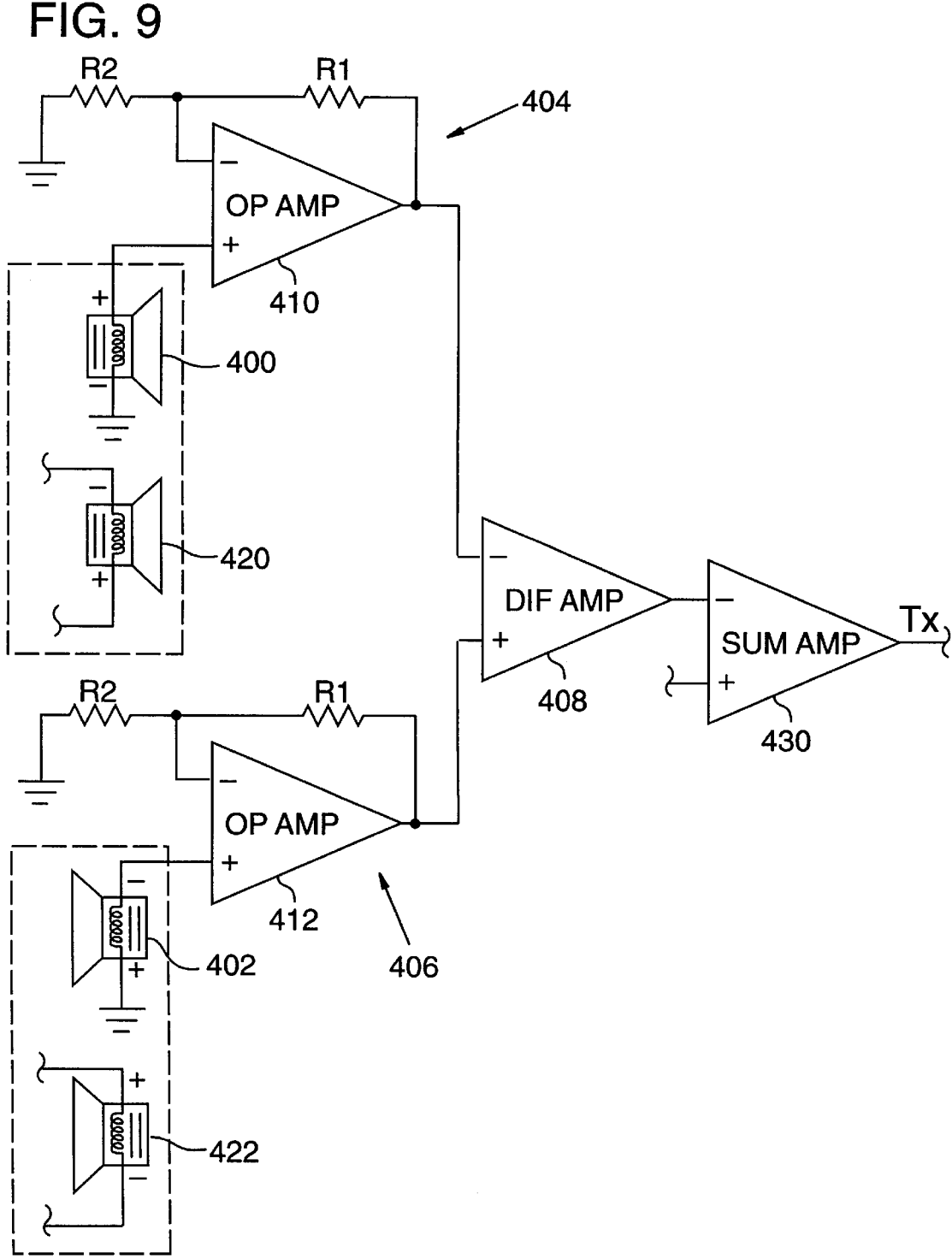
FIG. 9 is a schematic diagram illustrating a circuit for increasing the transmit signal in a full duplex communication device using additional microphones.

FIG. 9 is a schematic diagram illustrating one way to increase the Tx signal, while removing the signal attributable to the output of associated speaker/microphones. In this circuit, two additional microphones 400, 402 are coupled to respective input stages of a differential configuration. The input stages each comprise a linear amplifier 404, 406 that receives the signal produced in the microphone and transfers it to one of the inputs of a differential amplifier 408. Each linear amplifier is comprised of a conventional op amp 410, 412, resistor R1, coupled between the output of the op amp and its inverting input, and resistor R2 coupled between the inverting input and ground. The gain of the amplifier is a R1/R2, and therefore can serve as either a multiplier or a divider depending on the resistance values of R1 and R2.

Note that the microphones 400 and 402 are coupled with opposite polarity to their respective linear amplifiers. The voice input enters the microphones in phase, but is converted to voice signals that are approximately 180 degrees out of phase at the output of each microphone 400, 402. Acting as a subtractor, the differential amplifier 408 will nearly double the part of the input signal attributable to voice input.

Each of the microphones is paired with an associated speaker/microphone 420, 422 from another part of the circuit that has opposite polarity with respect to the other. Since the speaker/microphones have opposite polarity, the audio output of each speaker/microphones will be approximately 180 degrees out of phase with the other. One objective of this circuit arrangement is to remove the signal produced in each of the microphones attributable to the audio output of the associated speaker/microphone. As a result, the speaker/microphones 420, 422 should be paired with a microphone 400, 402 so that each microphone will take audio input that enters it at 180 degrees out of phase with the input to the other microphone and convert this input to electrical signals that are in phase. This enables the differential amplifier to remove, by subtraction, the input to the microphones 400, 402 attributable to the associated speaker/microphones 420,422.

For example, if this circuit were used with the circuit of FIG. 8, then microphone 400 would be paired with speaker/ microphone 358 (420 in this diagram), and microphone 402 would be paired with speaker/microphone 360 (422 in this diagram). Part of the audio output of speaker/microphone 420 will enter the microphone 400, which will convert it into an electrical signal. Similarly, part of the audio output of speaker/microphone 422 will enter the microphone 402, which will convert it into an electrical signal. Since the microphones have opposite polarity, they will convert the audio input from the speaker/microphones 420, 422 (respectively) so that the resulting electric signals are substantially in phase. The differential amplifier 408 will then remove the common mode signal substantially.

Because of the relationship between the transducer outputs, the configuration of the microphones and speaker microphones are an important aspect of this design. A speaker/microphone 420 and its associated microphone 400 should preferably be positioned in the same direction. In addition, both pairs of speaker/microphone and microphones should be pointed away from each other. This is graphically depicted in FIG. 9, where transducers 400 and 420 point in the same direction, transducers 402 and 422 point in the same direction, and the pairs 400, 420 and 402, 422 point directly away from each other. This configuration tends to isolate the output of dual purpose transducer 420 from microphone 402 and the output of dual purpose transducer 422 from microphone 400.

One possible configuration that satisfies this criteria is a box with transducers 400, 420 in an over-under relationship facing out at one side of the box, and transducers 402, 422 in a similar over under relationship facing out at the opposite side of the box. Of course, there are other possible configurations that will achieve acceptable results. It is important to remember that the objective of this design is use additional inputs to increase the Tx signal, while providing a configuration where any unwanted input can be removed substantially.

To achieve an increase in the Tx signal, this circuit includes a summing amplifier 130, which adds the Tx signal contribution from the circuit in FIG. 9 to the Tx signal produced in another part of the circuit. In FIG. 8 for example, the Tx signal from the differential amplifier 370 can be summed with the Tx signal produced at the output of the differential amplifier 408 in FIG. 9. This same approach can also be used in other speaker phone devices based on the circuit design shown in FIG. 4.

While I have described implementations of the invention in detail, it is important to note that the scope of the invention is not limited to these specific implementations. The full duplex communication circuit can be implemented using a variety of different combinations of the novel circuit elements described above. For example, the circuits for applying the receive signal to the transducer without loading the transducer can be combined with the circuits for simultaneously compressing the receive signal and expanding the transmit signal in a variety of ways. While using a differential configuration in combination with compressor-expanders can improve performance by more effectively canceling the receive signal, these elements do not need to be used together if the Tx and Rx levels are closer together. As another example, a full duplex transducer can be coupled with a circuits for simultaneously compressing the receive signal and expanding the transmit signal without using amplifiers in the input stage to avoid loading the transducer. However, better performance can be achieved by minimizing loading to avoid losses of the transmit signal, as explained above.

In view of the many possible embodiments to which the principles of my invention may be applied, it should be recognized that the illustrated embodiments are only examples of the invention and should not be taken as a limitation on the scope of the invention. Rather, the scope of the invention is defined by the following claims. I therefore claim as our invention all that comes within the scope and spirit of these claims.

I claim:

1. A full duplex audio communication circuit comprising:
   a first transducer for simultaneously converting audio input into an electrical transmit signal and converting an electrical receive signal representing audio data into audio output;
   a matching impedance device for receiving the electrical receive signal and balancing the impedance of the first transducer;
   a first amplifier coupled to the first transducer for transferring a combined transmit and receive signal;
   a second amplifier coupled to the matching impedance device for transferring the receive signal; and
   a differential amplifier coupled to the first and second amplifiers for receiving the combined transmit and receive signal from the first amplifier and the receive signal from the second amplifier and for substantially canceling the receive signals in common mode and passing the transmit signal.

2. The circuit of claim 1 wherein the matching impedance device is a second transducer for simultaneously converting audio input into a second transmit signal and for converting the receive signal to audio output; and wherein the second amplifier is coupled to the second transducer for transferring a second combined signal, including the second transmit signal and the receive signal, to the differential amplifier;
   and wherein the differential amplifier combines the transmit signal from the first transducer with the second transmit signal from the second transducer.

3. The circuit of claim 2 further including a first expander-compressor circuit coupled between the first amplifier and the differential amplifier, and a second expander-compressor circuit coupled between the second amplifier and the differential amplifier;
   wherein the first and second expander-compressor circuits expand the transmit signal and compress the receive signal.

4. The circuit of claim 2 further including:
   a second differential amplifier having first and second inputs;
   a first microphone coupled to the first input of the second differential amplifier, wherein the first microphone is positioned to receive first audio input including voice input and at least part of the audio output from the first transducer, and wherein the first microphone is operable to convert the first audio input to a first electrical signal;
   a second microphone with opposite polarity relative to the first microphone, the second microphone coupled to a second input of the second differential amplifier, wherein the second microphone is positioned to receive second audio input including the voice input and at least part of the audio output from the second transducer such that the audio output from the first transducer received in the first microphone is approximately 180 degrees out of phase with the audio output from the second transducer received in the second microphone, and wherein the second microphone is operable to convert the second audio input to a second electrical signal, and wherein the second differential amplifier approximately doubles electrical signals due to the voice input and substantially cancels common mode signals due to the audio output of the first and second transducers; and a summing amplifier coupled to outputs of the first and second differential amplifiers to combine output signals from the first and second differential amplifiers.

5. The circuit of claim 1 wherein the first amplifier comprises a linear amplifier for transferring the receive signal to the transducer with substantially no loading of the transducer.

6. The circuit of claim 5 wherein the linear amplifier comprises an op amp with a non-inverting input, and an inverting input; and wherein the non-inverting input receives the receive signal, the inverting input is coupled to the first transducer, and wherein the amplifier feeds the receive signal to the transducer at the inverting input without loading the transducer.

7. The circuit of claim 1 further including a bipolar transistor for driving the transducer with the receive signal and amplifying the transmit signal generated in the transducer.

8. The circuit of claim 7 wherein the transistor has a base, collector and emitter;

wherein the base receives the receive signal; and wherein the transducer is coupled to the emitter and the matching impedance device is coupled to the collector.

9. The circuit of claim 8 further including:

an inverter coupled to the collector;

an expander-compressor circuit; and a compressor circuit coupled to the inverter for compressing the receive signal;

wherein the first amplifier is coupled between the first transducer and the expander-compressor circuit, and wherein the differential amplifier is coupled to the expander-compressor circuit and the compressor circuit for receiving the combined signal from the expander-compressor circuit and the received signal from the compressor circuit, for combining the combined signal from the expander-compressor circuit with the receive signal from the compressor circuit such that the receive signal is substantially canceled.

10. The circuit of claim 9 wherein the matching impedance device is a second transducer and the compressor is part of a second expander-compressor circuit for compressing the receive signal and expanding a transmit signal from the second transducer; and wherein the differential amplifier is coupled to the expander-compressor circuit and the second expander compressor circuit for adding the transmit signals from the first and second transducers and for canceling the receive signal.

11. The circuit of claim 1 further including:

an output stage for receiving the output signal of the differential amplifier and for expanding the transmit signal and compressing the receive signal.

12. The circuit of claim 1 wherein the first transducer is driven with the receive signal without loading the first transducer.

13. The circuit of claim 1 wherein the first transducer is driven with the receive signal without shunting the first transducer.

14. A full duplex audio communication circuit for simultaneously producing audio output and transmitting audio input, the circuit comprising:

a first transducer for converting audio input into an electrical transmit signal and for converting an electrical receive signal representing audio data into audio output;

a second transducer for converting the audio input into a second electrical transmit signal and for converting the electrical receive signal representing audio data into audio output; and an audio processing circuit coupled to the first transducer for receiving a combined signal including the transmit signal and the receive signal, for simultaneously expanding the transmit signal and compressing the receive signal to produce an output transmit signal with at least 25 dB separation between the transmit signal and the receive signal;

wherein the first and second transducers have opposite polarity with respect to each other, and the audio processing circuit includes a first differential amplifier for receiving the combined signal from the first transducer and for receiving a second combined signal, including the second transmit signal and the receive signal, from the second transducer, and for substantially canceling the receive signal while combining the transmit signals from the first and second transducers.

15. The circuit of claim 14 wherein the receive signal is applied to the first and second transducers using an op amp to minimize loading of the first and second transducers.

16. The circuit of claim 14 further including:

a second differential amplifier having first and second inputs;

a first microphone coupled to the first input of the second differential amplifier, wherein the first microphone is positioned to receive first audio input including voice input and at least part of the audio output from the first transducer, and wherein the first microphone is operable to convert the first audio input to a first electrical signal;

a second microphone with opposite polarity relative to the first microphone, the second microphone coupled to a second input of the second differential amplifier, wherein the second microphone is positioned to receive second audio input including the voice input and at least part of the audio output from the second transducer such that the audio output from the first transducer received in the first microphone is approximately 180 degrees out of phase with the audio output from the second transducer received in the second microphone, and wherein the second microphone is operable to convert the second audio input to a second electrical signal, and wherein the second differential amplifier approximately doubles electrical signals due to the voice input and substantially cancels common mode signals due to the audio output of the first and second transducers; and a summing amplifier coupled to outputs of the first and second differential amplifiers to combine output signals from the first and second differential amplifiers.

17. A full duplex audio communication circuit comprising:

a first transducer for converting audio input into an electrical transmit signal and for converting an electrical receive signal representing audio data into audio output;

a second transducer for converting audio input into a second transmit signal and for converting the electrical receive signal into audio output;

a first expander-compressor circuit coupled to the first transducer for receiving a combined signal including the transmit and receive signal, for expanding the transmit signal and compressing the receive signal;

a second expander-compressor coupled to the second transducer for receiving a combined signal including the second transmit and the receive signal, for expanding the second transmit signal and compressing the receive signal;

a differential amplifier coupled to the expander-compressor circuit and the second expander-compressor circuit for receiving the combined signal from the first expander-compressor circuit and the combined signal from combined signal second expander-compressor circuit, for combining the combined signal from the first expander-compressor circuit with the combined signal from the second expander-compressor circuit such that the receive signal is substantially canceled.

18. A full duplex audio communication circuit comprising:

a transducer for converting audio input into an electrical transmit signal and for converting an electrical receive signal representing audio data into audio output;

a matching impedance device for receiving the electrical receive signal and balancing the impedance of the first transducer;

a first amplifier for transferring the receive signal to the transducer with substantially no loading of the transducer.

a second amplifier coupled to the matching impedance device for transferring the receive signal; and a differential amplifier coupled to the first and second amplifiers for substantially canceling the electrical receive signals.

19. The circuit of claim 18 wherein the first amplifier comprises an op amp with a non-inverting input, an inverting input, an output and a resistor coupled between the inverting input and the output; and wherein the non-inverting input receives the receive signal, wherein the inverting input is coupled to the transducer, and wherein the first amplifier feeds the receive signal to the transducer with substantially no loading of the transducer.

20. The circuit of claim 18 wherein the first amplifier comprises an op amp with a non-inverting input, and an inverting input; and wherein the non-inverting input receives the receive signal, wherein the inverting input is coupled to the transducer, and wherein the first amplifier feeds the receive signal to the transducer with substantially no loading of the transducer.

21. The circuit of claim 18 wherein the first amplifier comprises an op amp with a non-inverting input, an inverting input, and an output; and wherein the non-inverting input receives the receive signal, wherein the transducer is coupled between the inverting input and the output, and wherein the first amplifier feeds the receive signal to the transducer with substantially no loading of the transducer.

22. The circuit of claim 18 wherein the first amplifier comprises a bipolar junction transistor coupled in a common emitter configuration, wherein the transducer is coupled to the emitter of the transistor, wherein the transistor receives the receive signal at the base of the transistor, and wherein the transistor amplifies the receive signal and applies the amplified receive signal to the transducer with substantially no loading of the transducer.

23. A method for performing full duplex communication using at least first and second transducers for converting audio input into an electrical transmit signal and for converting an electrical receive signal representing audio data into audio output; the method comprising:

applying the receive signal to the first and second transducers with substantially no loading of the transducers;

generating combined signals including the transmit signal and the receive signal at an output of the transducers; and receiving the combined signals and simultaneously expanding the transmit signal and reducing the receive signal in the combined signals.

24. A method for performing full duplex communication using a transducer for converting audio input into an electrical transmit signal and for converting an electrical receive signal representing audio data into audio output; the method comprising:

applying the receive signal to the transducer without loading the transducer;

applying the receive signal to a second transducer without loading the second transducer;

generating a first combined signal including the transmit signal and the receive signal at an output of the transducer;

generating a second combined signal including the transmit signal and the receive signal at an output of the second transducer, wherein the transmit signal from the second transducer is out of phase with the transmit signal from the first transducer;

receiving the combined signal and simultaneously expanding the transmit signal and reducing the receive signal in the combined signal; and subtracting the combined signals from the first and second transducers such that the combined transmit signal from each transducer is approximately doubled and the combined receive signal is substantially canceled.

25. A method for performing full duplex communication using transducers for converting audio input into an electrical transmit signal and for converting an electrical receive signal representing audio data into audio output; the method comprising:

using a first set of transducers to convert the audio input into a plurality of electrical transmit signals and to convert an electrical receive signal representing audio data into a plurality of audio output signals, wherein signals at the output of each transducer comprise both the receive and transmit signals;

applying the receive signal to the transducers without loading the transducers;

generating combined signals, each including the transmit signal and the receive signal at an output of a corresponding transducer;

combining the signals at the output of each of the transducers of the first set; and receiving the combined signals and simultaneously expanding the transmit signal and reducing the receive signal in the combined signals.

26. The method of claim 25 further including:

using a second set of transducers to convert the audio input into a plurality of electrical transmit signals and to convert an electrical receive signal representing audio data into a plurality of audio output signals, wherein signals at the output of each transducer in the second set comprise both the receive and transmit signals and wherein the transmit signal is out of phase with the transmit signal generated by each transducer in the first set;

combining the signals at the output of each of the transducers of the second set;

subtracting the combined signals from the first and second set of transducers such that the combined transmit signal from each set is approximately doubled and the combined receive signal is substantially canceled.

* * * * *

UNITED STATES PATENT AND TRADEMARK OFFICE
CERTIFICATE OF CORRECTION

PATENT NO. : 5,907,538

DATED : May 25, 1999

INVENTOR(S) : White

It is certified that error appears in the above-identified patent and that said Letters Patent is hereby corrected as shown below:

In the Drawings:

Fig. 4, "130" should read "132".

In the Specification:

Column 2, line 6, "here" should read --hear--.

Column 4, line 61, "amplifier 20" should read --amplifier 22--.

Column 5, line 62, "user can experiences" should read --user can experience--.

Column 7, line 14, "common made" should read --common mode--.

Column 7, line 34, "circuit is achieves" should read --circuit achieves--.

Column 9, line 16, "10651M" should read --1065IM--.

Column 9, line 22, "that" should read --than--.

Column 10, line 25, "the prevents the" should read --the amplifier prevents the--.

Column 14, line 19, "advantageous" should read --advantages--.

Column 14, line 54, "conventual" should read --conventional--.

Column 16, line 17, "circuit" should read --circuit.--.

Column 17, line 32, "is use" should read --is to use--.

Column 17, line 60, "circuits" should read --circuit--.

UNITED STATES PATENT AND TRADEMARK OFFICE
CERTIFICATE OF CORRECTION

PATENT NO. : 5,907,538
DATED : May 25, 1999
INVENTOR(S) : White

It is certified that error appears in the above-identified patent and that said Letters Patent is hereby corrected as shown below:

<u>In the Claims:</u>

Column 21, line 7, (claim 17) "combined signal" should read --the combined signal--.

Column 21, line 21, (claim 20) "transducer." should read --transducer;--.

Signed and Sealed this

Thirteenth Day of June, 2000

Attest:

Attesting Officer

Q. TODD DICKINSON

Director of Patents and Trademarks